Oct. 23, 1956  M. E. BOENIG  2,767,635
ROW MARKER
Filed June 17, 1955
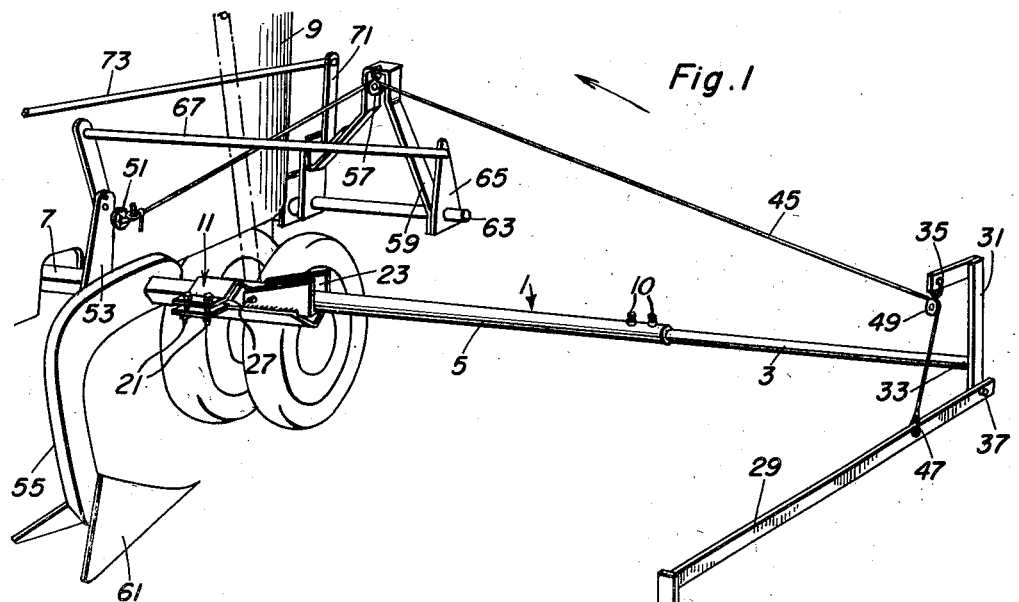
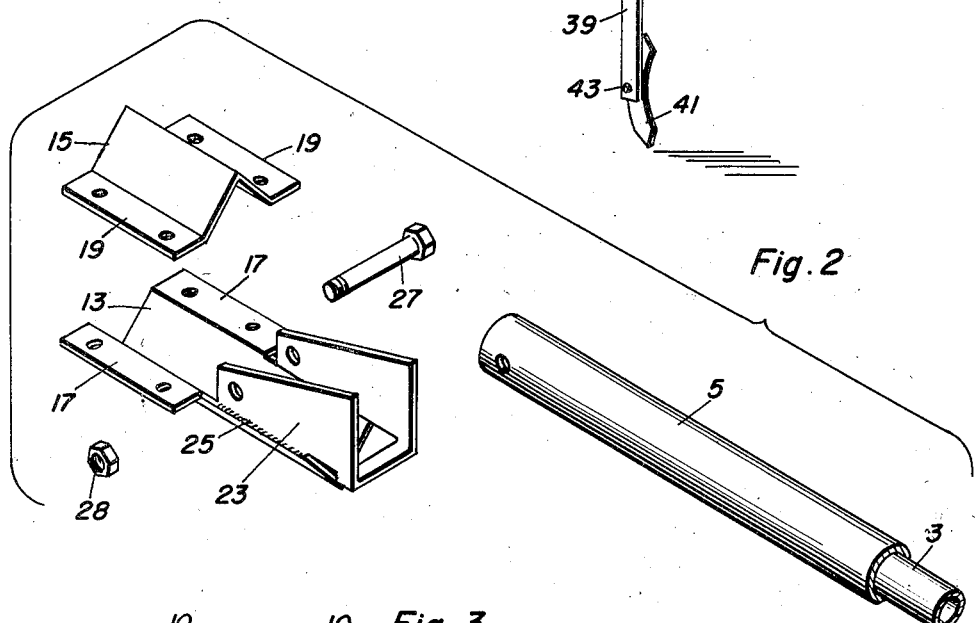
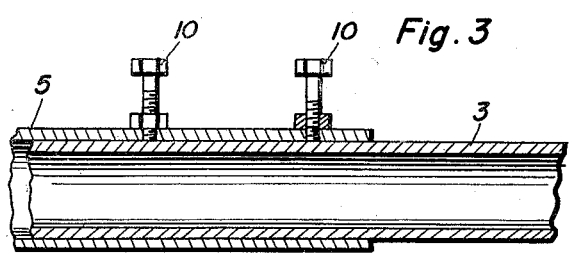
Martin E. Boenig
INVENTOR.

United States Patent Office 2,767,635
Patented Oct. 23, 1956

2,767,635

ROW MARKER

Martin E. Boenig, Woodsboro, Tex.

Application June 17, 1955, Serial No. 516,287

2 Claims. (Cl. 97—230)

My invention relates to row markers of the type attached to the front tool bar of a tractor plow for lowering and raising into and out of marking position by lowering and raising of the tool bar to lower and raise the plow into and out of the ground, and is designed as an improvement over the row marker of my U. S. Patent No. 2,613,586, dated October 14, 1952.

The primary object of my invention is to provide a row marker blade on a marker arm for pivoting vertically to compensate for travel of the blade over uneven ground, and means for automatically raising the arm when the tool bar is raised to thereby raise the marker blade out of marking position when the plow is raised out of the ground.

Another object is to provide an extensible boom for mounting the marker arm on the tool bar at selected distances from the plow, and means for pivotally mounting the boom on the tool bar for swinging into upright position to swing the marker arm and marker blade close to the tractor to facilitate driving the tractor through gates and along roads.

Still another object is to provide cable and pulley means for lowering and raising the marker arm and marker blade out of and into the ground in response to lowering and raising of the plow beam.

Other and subordinate objects together with the precise nature of my improvements will become readily apparent when the following description and claims are read with reference to the drawing accompanying and forming part of this specification and in which:

Figure 1 is a fragmentary view in perspective of my improved row marker attached to the tool bar of the tractor;

Figure 2 is an exploded view in perspective partly in section of the boom and means for mounting the same on the tool bar; and Figure 3 is an enlarged fragmentary view in longitudinal section of the boom.

Referring to the drawings by numerals, according to my invention, a boom 1 comprising tubular telescopic outboard and inboard sections 3, 5, laterally with respect to the tractor 9 is pivotally mounted, by means presently described, on the outer end of the front tool bar 7 of a tractor 9 for lowering vertically to extend outwardly from said bar 7 parallel therewith and laterally of the tractor 9, as shown in full lines in Figure 1, or to be swung upwardly into upright position close to the tractor 9, as shown in dotted lines in Figure 1. The outboard boom section 3 is slidable in the inboard boom section 5 to lengthen or shorten said boom. Setscrews 10 in the inboard boom section 5 secure said sections together when the boom 1 is extended or contracted.

The means for mounting the boom 1 comprises a clamp 11 on the outer end of the tool bar 7 which, as is usual, is square in cross-section. The clamp 11 comprises a bottom clamp section 13 of V shape in cross-section fitting upwardly against said bar 7, and a relatively shorter similarly shaped top section 15 fitting over the top of said bar 7, sections 13, 15 being provided with longitudinal, apertured side flanges 17, 19 secured together by bolts 21. A channel guide 23 is welded, as at 25, in the outer end of the bottom section 13 and opens upwardly. The inboard boom section 5 is pivoted at its inner end in the guide by a cross-bolt 27 with a nut 28 so that the guide limits downward swinging of the boom 5 to horizontal position and prevents side sway of said boom 5 when horizontal.

The marker arm 29 is mounted on the outer end of the outboard boom section 3 by means of the following. A cross-bar 31 is welded intermediate its ends, as at 33, on said outer end of the outboard boom section 3 and which extends vertically with a rearwardly extending upper arm 35 when said boom 1 is lowered and the marker arm 29 extending rearwardly from its lower end and pivoted, as at 37, thereto for vertical swinging relative to the lowered boom. A shank bar 39 on the trailing end of the marker arm 29 adapted to depend therefrom carries a marker blade 41 bolted thereto, as at 43, and reversible end for end for interchanging said ends.

The cable means comprises a cable 45 attached at one end, as at 47, to the marker arm 29, trained over a pulley 49 on the arm 35 to pull said marker arm 29 upwardly when the boom 5 is lowered and also trained from said pulley 49 over the lowered boom 5 longitudinally thereof with its other end fastened, as at 51, to a vertical upright 53 on the plow beam 55 fixed, as is usual, on the tool bar 7. Intermediate its ends, the cable 45 is trained over a pulley 57 on an upstanding rocker yoke 59 which rocks forwardly and rearwardly to raise and lower the plow beam 55 and plow 61.

The pulley 57 is oscillated by the rocker yoke 59 forwardly and rearwardly above the attached end 51 of the cable 45 and above the pulley 49, that is, when the boom is lowered, and for a purpose presently seen.

The rocker yoke 59 forms part of a conventional lift mechanism for rocking the tool bar 7 in opposite directions to raise and lower the plow 61 and is pivoted on a shaft 63 on the tractor 9, operatively connected to the plow beam 55 to raise and lower the same by a crank 65 on the yoke, and a rod 67 connecting the crank 65 to the upright 53. The yoke 59 is operated by a crank arm 71 thereon operated by a rod 73. The lift mechanism, per se, forms no part of the present invention except as it may enter into combination therewith.

As will be readily understood, the boom 1 is lowered by hand into the horizontal outstanding position shown in Figure 1. The rocker yoke 59 is rocked rearwardly and downwardly for lowering the plow beam 55 and the plow 61 to the ground and rocked upwardly and forwardly to raise said beam and plow. When said yoke is rocked rearwardly and downwardly, it lowers the cable 45 into slack condition so that the marker arm 29 may pivot vertically as the marker plate 41 travels over the ground. When said rocker yoke 59 is rocked forwardly and upwardly to lift the plow beam and plow 61 out of the ground, the pulley 57 is lifted to pull on the cable 45 and lift the marker arm 29 and marker plate 41 above the ground into non-marking position. When the tractor 9 is travelling on the road or through a gate, the boom 5 may be manually swung on its clamp 11 into the upright overbalanced position, shown in dotted lines in Figure 1, and whereby to swing the marker arm 29 and marker plate 41 into elevated position close to the tractor 9.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. The combination with a tool carrying beam mounted on the rockable tool bar of a tractor for vertical swinging in opposite directions to raise and lower the tool, and a yoke operatively connected to said beam and pivoted on the tractor for raising and lowering to raise and lower the beam, of a boom having an inner end mounted on said bar and extending outwardly therefrom, a row marker arm, means pivotally mounting said marker arm on the outer end of said boom for raising and lowering, a flexible member connected to said beam and marker arm, means on said yoke engaging said member and raising and lowering the same to raise and lower said marker arm when said beam is raised and lowered, and a row marker plate on said marker arm raised and lowered out of and into marking position by said marker arm.

2. The combination of claim 1, said first means comprising a vertical cross-bar on the outer end of said boom, a rearwardly extending arm on said crossbar having a pulley thereon above said boom and marker arm and over which said member is trained.

References Cited in the file of this patent

UNITED STATES PATENTS

| | | |
|---|---|---|
| 607,021 | Douglas | July 12, 1898 |
| 665,587 | Tannehill | Jan. 8, 1901 |
| 2,178,124 | Robinson | Oct. 31, 1939 |